Figure 1:
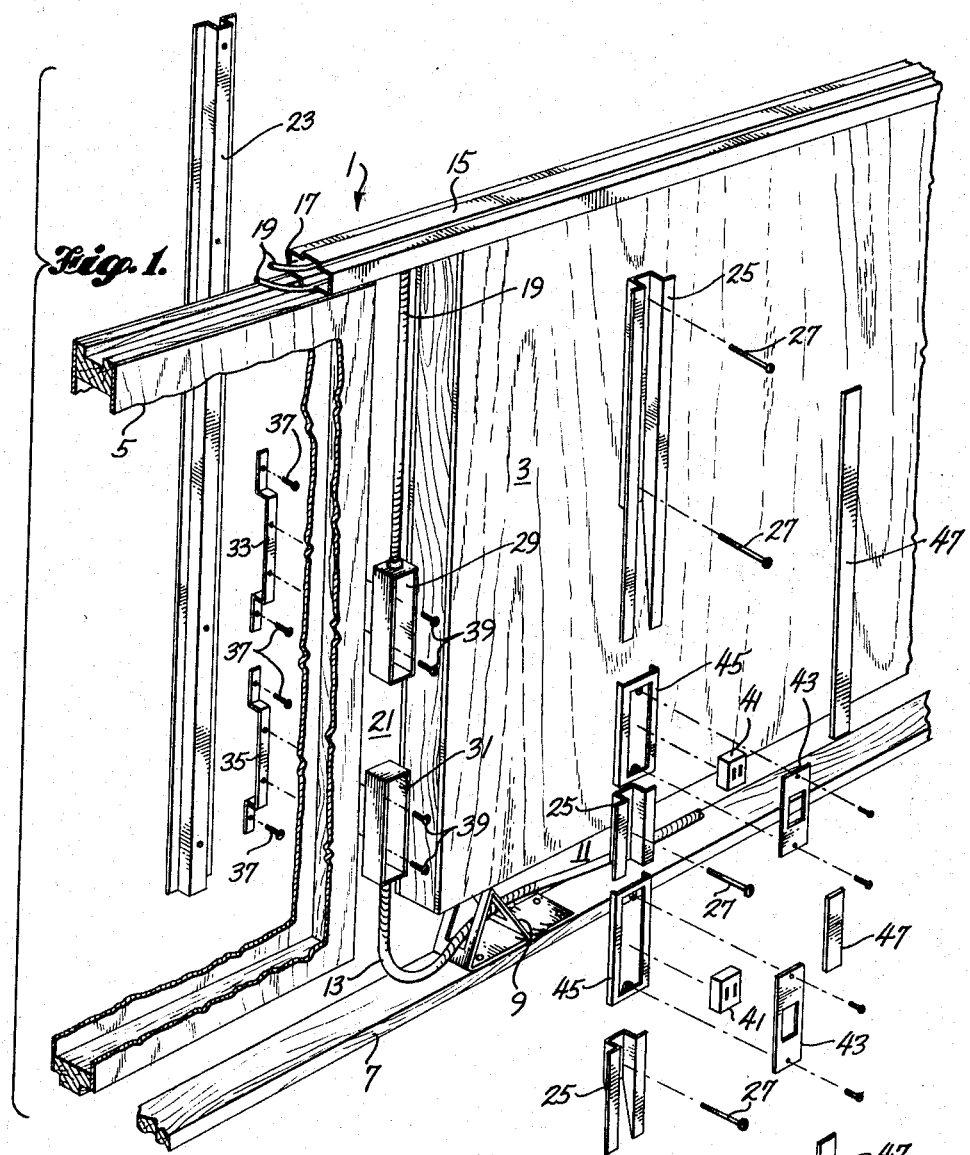

May 2, 1967 S. A. BRUDEVOLD 3,316,624
METHOD OF INSTALLING UTILITY OUTLET IN MOVABLE PARTITIONS
Filed April 1, 1965

INVENTOR.
SIGMUND A. BRUDEVOLD
BY
ATTORNEYS ted States Patent Office 3,316,624
Patented May 2, 1967

3,316,624
METHOD OF INSTALLING UTILITY OUTLET IN MOVABLE PARTITIONS
Sigmund A. Brudevold, Puyallup, Wash., assignor to Weyerhaeuser Company, Tacoma, Wash., a corporation of Washington
Filed Apr. 1, 1965, Ser. No. 444,532
4 Claims. (Cl. 29—400)

This invention is related to a method of installing utilities in partitions and is particularly related to the method of installing wiring outlets and switches in movable partition systems.

In this era of industrial and business growth and change, the flexibility of movable partition systems has provided a means for accommodating office and other space arrangement changes in an efficient and economical manner. Since most office space requires various electrical services, including lights, wall plugs, telephones, communication systems, and may also include demands for air, gas, water and other utilities, it has not been an easy task to make continual changes in the arrangement of walls in various buildings whenever such utilities are to be hidden from sight without causing obstructions in the floor or ceiling.

In United States Patent No. 2,947,041 there is a disclosure, in FIGURE 7, of one method for incorporating electrical circuits into movable partitions. In accordance with this method disclosed radio antennas and other electrical wiring extends horizontally between opposing vertical edges of each partition section. The cable may also be connected to an outlet box formed as a part of the partition with each of the cables provided with suitable connections at the vertical edges of the partition section so that they will be automatically connected to a similar cable in an adjoining partition section as the partition sections are assembled to form the completed partition.

It should be noted, however, that this installation of wiring is elaborate and requires a number of connector plugs and exact alignment between adjacent panels to engage each plug. This system would also make it difficult to accommodate partitions not having a standard width since each cutting, to accommodate a desired installation, would require a special installation of wiring and plugs.

It is, therefore, the object of this invention to provide a method for installing utilities, including electrical conduits and outlets in movable partition systems, in such a manner that the utilities may be hidden from view and may be installed and changed with the least amount of difficulty.

Another object of the invention is to provide a method for installing electrical and other utilities in movable partition systems and to place the outlets of such utilities in the space between adjacent panel sections of the partition system.

Still another object of the invention is to provide a method for installing electrical and other utilities in movable partition systems which permits change of such installation without major interruption of the installation of the partitions themselves.

Still further object of this invention is to provide a method of installing electrical wiring which enables concealed, National Electrical Code-approved wiring to be installed in movable partition systems.

Figure 2:
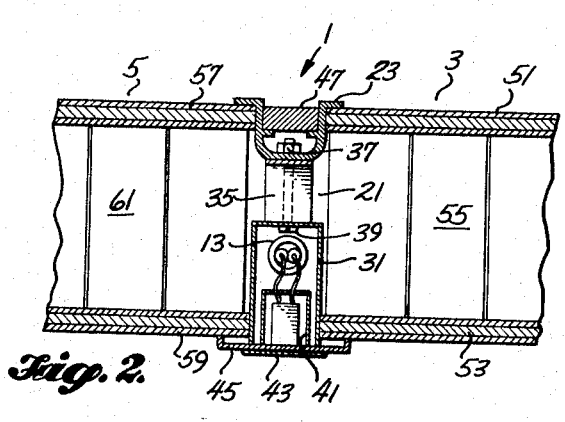

The above, and other objects of the invention, will be more readily understood from the following description in conjunction with the accompanying drawing in which:

FIGURE 1 is an exploded perspective view with some parts cut away of a junction between two movable panels illustrating the manner of installation of the electrical switches and outlets in accordance with the invention; and FIGURE 2 is a horizontal cross-sectional view with some parts removed of a junction between two panel sections, illustrating the manner of installation of an electrical outlet in accordance with this invention.

Referring now in more detail to FIGURE 1, there is shown a typical junction 1 between movable partition panels 3 and 5. Panel 5 is shown with the center section removed to permit a better view of the components of junction 1. Panels 3 and 5 may be supported from the floor by any suitable means which may include a floor runner 7 and vertically adjustable supports 9. The space between the lower edges of the panels 3 and 5 and the upper surface of the floor runner 7 will be referred to as base space 11, which space permits passage of electrical conduits and other utilities such as cable 13.

The upper edges of the panels 3 and 5 may be flush with the ceiling, may be free standing, or may be capped by means of cornice 15 which may be interposed between the top edges of the panels and the ceiling or used as a finishing cap for panels which do not reach the ceiling. The cornice 15 may be constructed so that it provides a hollow space, referred to as cornice space 17, above the top edges of the panels 3 and 5. The cornice space 17 provides a passageway for other electrical, telephone or other utility conduits, such as conduit 19.

At the junction 1 between two adjacent panels, such as panels 3 and 5, there is defined a mullion space 21, which provides room for the vertical running of cables 13 and conduit 19 between the vertical side edges of the panels 3 and 5.

To further define an enclose the mullion space 21 there is also provided a series of mullions. Back mullion 23 is held in place by clamping panels 3 and 5 between itself and front mullion 25 by means of clamping bolts 27. Since the front mullion 25 is cut into sections to accommodate the utility outlet boxes 29 and 31, it is necessary that there be at least one clamping bolt 27 for each of these individual sections of front mullion 25.

To insure the proper support of the utility outlet boxes 29 and 31, there are provided stand-off brackets 33 and 35, which are secured to the back mullion 23 by suitable fastening means 37. Similar fastening means 39 may be used to secure the utilities outlet boxes 29 and 31 to stand-off brackets 33 and 35. Of course, it would be obvious for one skilled in the art to provide an outlet box which included a stand-off bracket or spring mounted means or other suitable mounting structure for spanning the space between the outlet box and the back mullion 23.

The wires within the cables 13 and conduit 19 may be connected to electrical despard devices 41. These devices may be gas outlets, electrical outlets, plug-ins, light switches, telephone connectors, radio antenna outlets, television antenna outlets, microphone connecting plugs, speaker outlets, intercom connectors, buzzers, and any number of other utility outlets or controls.

To finish off the junction 1 between the panels 3 and 5, there is provided a series of outlet plates 43 and trim pieces 45 which close off the exposed side of the outlet boxes 29 and 31. As a finishing touch for aesthetic purposes, a mullion insert 47 may be provided.

Referring now to FIGURE 2, there is shown a horizontal cross-sectional view with some parts being cut away for clarity of the typical junction 1. The panel 3 may have a back face member 51 which is separated from a front face member 53 by means of a panel core, such as honeycomb core 55. Panel 5 may also have a back face member 57 which is separated from the front face member 57 by means of a honeycomb core 61.

The method of installing utility outlets between the movable partition panels 3 and 5 may include the steps of laying the cable or conduit 13 in the base space 11 beneath the panels and/or laying the cables or conduits 13 or 19 in the cornice space 17 and then running the cables down to the mullion space 21. The stand-off brackets 33 or other suitable outlet box supporting means, may be mounted on the back mullion 23 opposite the desired location of the utility outlet boxes 29 and 31. The outlet boxes 29 and 31 may be then mounted on the stand-off brackets 33 and 35 by suitable fastening means 39 and the electrical or other utility connections may be made with the despard devices 41 or suitable other outlet or control devices. The space 21 between the panels 3 and 5 may be sealed off by installation of front mullion sections 25, which may be connected by clamping bolts 27 to the back mullion 23 and by installing outlet plates 43 and trim pieces 45 to close off the individual utility outlet boxes 29 and 31.

Changes can be made in these installations without taking the panels 3 and 5 away from their supports and these changes can be made without injury to the floor or ceiling, and without injury to the panel installation, other than the minor modifications to the trim and mullion pieces.

It is, thus, seen that applicant has provided a method of installing various types of utilities in movable partition systems without the need of complicated panel conduits and accessories, such as are required in the prior art installations. It is also to be noted that once installed, all of the conduits are hidden from sight, do not obstruct the floor or ceiling areas, and such installations can be easily changed.

It is anticipated that various changes may be made in the process as special needs arise and special unitized devices become available, with certain features and steps being omitted or added, with or without the use of other steps. All such modifications are intended to be within the scope of the appended claims.

Having now described my invention and in what manner the same may be used, what I claim is new and desire to protect by Letters Patent is:

1. A method of installing utilities in movable partitions, which include panel units supported above the floor level with each panel unit joined to the adjacent panel unit by mullions, comprising:
   laying utility conduits in the base space beneath said panels,
   running said conduits from said base space up between adjacent panel units between mullions where utility outlets are desired securing stand-off bracket means on one of said mullions,
   mounting utility outlet boxes on said bracket means, installing the conduit connections into said outlet boxes,
   clamping said adjacent panel units between said mullions accommodating said utility boxes with at least one clamping bolt for each of the individual sections of said mullions; and
   mounting trim plates on the exposed side of said outlet boxes to seal the space between said adjacent panels.

2. A method of installing wiring and outlets in movable partitions, which include panel units supported above the floor level with each panel unit joined to the adjacent panel unit by mullions, comprising:
   laying wire in the base space beneath said panels,
   running the wire from said base space up between adjacent panel units between mullions where outlets are desired,
   mounting a stand-off bracket on the back mullion opposite the desired location of each outlet,
   mounting the outlet box on said stand-off bracket,
   installing wiring in said outlet box and connecting it to the outlet despard devices,
   clamping said adjacent panel units between said mullions accommodating said box with at least one clamping bolt for each of the individual sections of said front mullions; and
   mounting trim plates on the exposed side of said outlet box and mullion to seal the space between said adjacent panels.

3. The method of installing wiring and switches in movable partitions, which include panel units having cornice caps at their top edges with each panel unit joined to the adjacent panel unit by mullions, comprising:
   laying wire in the cornice space above the panel edges within said cornice caps,
   running wire from said cornice space down between adjacent panels between mullions where switches are desired,
   mounting a stand-off bracket on the back mullion opposite the desired location of each switch,
   mounting said switch box on said stand-off bracket,
   installing wiring in said switch box and connecting it to the switch device,
   clamping said adjacent panel units between said mullions accommodating said box with at least one clamping bolt for each of the individual sections of said mullions; and
   mounting trim plates on the exposed side of said switch box and mullion to seal the space between adjacent panels.

4. A method of installing wiring, outlets and switches in movable partitions, which include panel units supported above the floor level having cornice caps at the top edges with each panel unit joined to the adjacent panel unit by mullions, comprising:
   laying wire in the base space beneath said panels and in the cornice space above the panel edges within said cornice caps,
   running wire from said base space up between adjacent panels between mullions where outlets are desired,
   running wire from said cornice space down between adjacent panels between mullions where switches are desired,
   mounting standoff brackets on the back mullion opposite the desired location of each outlet and switch box,
   mounting the outlet and switch boxes on their appropriate standoff brackets,
   installing wiring in said outlet and switch boxes and connecting it to the outlet despard and switch devices,
   clamping said adjacent panel units between said mullions accommodating said front boxes with at least one clamping bolt for each of the individual sections of said front mullions; and
   mounting trim plates on the exposed side of said outlet and switch boxes and mullions to seal the space between adjacent panels.

References Cited by the Examiner
UNITED STATES PATENTS
2,947,041  8/1960  Imbrecht _____ 52—241 X JOHN F. CAMPBELL, *Primary Examiner,*

THOMAS H. EAGER, *Examiner.*